(12) United States Patent
Xu et al.

(10) Patent No.: US 6,979,979 B2
(45) Date of Patent: Dec. 27, 2005

(54) GAS TURBINE ENGINE STARTER-GENERATOR EXCITER STARTING SYSTEM AND METHOD INCLUDING A CAPACITANCE CIRCUIT ELEMENT

(75) Inventors: Mingzhou Xu, Tucson, AZ (US); Wayne T. Pearson, Tucson, AZ (US); Yuan Yao, Mississauga (CA); Jim Lengel, Tucson, AZ (US); Cristian E. Anghel, Mississauga (CA)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/022,158

(22) Filed: Dec. 22, 2004

(65) Prior Publication Data

US 2005/0225303 A1 Oct. 13, 2005

Related U.S. Application Data

(62) Division of application No. 10/278,830, filed on Oct. 23, 2002.

(51) Int. Cl.[7] .............................. H02P 9/30; H02P 9/42; H02P 47/04; H02K 16/00; H02K 21/04
(52) U.S. Cl. ............................. 322/59; 322/17; 322/29; 322/44; 290/31; 290/4 R
(58) Field of Search .............................. 322/17, 29, 44, 322/59; 290/4 R, 31

(56) References Cited

U.S. PATENT DOCUMENTS

| | | | |
|---|---|---|---|
| 599,932 A | 3/1898 | Frankenfield et al. ....... 388/808 |
| 2,540,202 A * | 2/1951 | Haas ............................. 322/59 |
| 2,689,327 A * | 9/1954 | Hass ............................. 322/28 |
| 3,233,158 A | 2/1966 | Gilbert ......................... 318/743 |
| 3,263,144 A | 7/1966 | Neyhouse et al. ........... 318/776 |
| 3,412,304 A | 11/1968 | Baum et al. ................. 318/743 |
| 3,585,471 A | 6/1971 | Ecclesia ....................... 318/770 |
| 3,753,069 A | 8/1973 | Newton ....................... 318/440 |
| 3,908,161 A * | 9/1975 | Messenger ................... 322/29 |
| 4,072,880 A | 2/1978 | Oshima et al. .............. 323/321 |
| 4,168,459 A * | 9/1979 | Roesel, Jr. .................... 322/29 |
| 4,352,051 A | 9/1982 | Johnson ....................... 318/790 |
| 4,371,906 A | 2/1983 | Alessio et al. ................ 361/51 |
| 4,459,532 A | 7/1984 | Schutten et al. ............. 318/781 |
| 4,486,801 A | 12/1984 | Jackovich et al. ............ 361/21 |
| 4,675,591 A | 6/1987 | Pleiss .......................... 318/773 |
| 4,743,777 A * | 5/1988 | Shilling et al. ................ 290/46 |
| 5,097,163 A * | 3/1992 | Shah et al. .................... 310/51 |
| 5,103,153 A | 4/1992 | Droho ......................... 318/777 |
| 5,418,436 A | 5/1995 | Apuzzo ....................... 318/497 |
| 5,455,885 A | 10/1995 | Cameron ..................... 388/834 |
| 5,537,020 A | 7/1996 | Couture et al. ............. 318/720 |
| 5,650,707 A | 7/1997 | Lipo et al. ................... 318/773 |
| 5,714,821 A * | 2/1998 | Dittman ....................... 310/179 |
| 5,850,138 A | 12/1998 | Adams et al. ................. 322/68 |

(Continued)

FOREIGN PATENT DOCUMENTS

WO PCT/US03/33019 7/2004

*Primary Examiner*—Darren Schuberg
*Assistant Examiner*—Pedro J. Cuevas
(74) *Attorney, Agent, or Firm*—Ingrassia Fisher & Lorenz

(57) ABSTRACT

A rotating electrical machine, such as an aircraft starter-generator, that includes an exciter that has its stator windings supplied with electrical power from a power supply. One or more switches are electrically coupled between the exciter stator winding and the power supply and are configured and controlled so that a capacitance may be selectively placed electrically in series with the exciter stator windings.

7 Claims, 4 Drawing Sheets

U.S. PATENT DOCUMENTS

| | | | |
|---|---|---|---|
| 6,025,693 A | 2/2000 | Smith | 318/768 |
| 6,066,941 A | 5/2000 | French | 322/90 |
| 6,072,303 A * | 6/2000 | Nickoladze et al. | 322/20 |
| 6,204,618 B1 | 3/2001 | Wang et al. | 318/431 |
| 6,628,024 B1 * | 9/2003 | Mirmobin | 310/71 |
| 6,628,104 B2 * | 9/2003 | Yao et al. | 322/59 |
| 6,724,099 B2 * | 4/2004 | Klaar | 290/52 |
| 6,768,278 B2 * | 7/2004 | Xu et al. | 318/140 |
| 2002/0117999 A1 | 8/2002 | Yao et al. | 322/59 |
| 2004/0080300 A1 * | 4/2004 | Xu et al. | 322/59 |

* cited by examiner

GAS TURBINE ENGINE STARTER-GENERATOR EXCITER STARTING SYSTEM AND METHOD INCLUDING A CAPACITANCE CIRCUIT ELEMENT

CROSS REFERENCE TO RELATED APPLICATION

This application is a divisional of Ser. No. 10/278,830 filed on Oct. 23, 2002.

FIELD OF THE INVENTION

The present invention relates to rotating electrical machines such as high speed starter generators for gas turbine engines and, more particularly, to a starter-generator exciter starting system and method.

BACKGROUND OF THE INVENTION

An aircraft may include various types of rotating electrical machines such as, for example, generators, motors, and motor/generators. Motor/generators are used as starter-generators in some aircraft, since this type of rotating electrical machine may be operated as either a motor or a generator.

An aircraft starter-generator may include three separate brushless generators, namely, a permanent magnet generator (PMG), an exciter generator, and a main motor/generator. The PMG includes permanent magnets on its rotor. When the PMG rotor rotates, AC currents are induced in stator windings of the PMG. These AC currents are typically fed to a regulator or a control device, which in turn outputs a DC current if the starter-generator is operating as a generator. Conversely, if the starter-generator is operating as a motor, the control device supplies AC power.

If the starter-generator is operating as a generator, the DC current from the control device is supplied to stator windings of the exciter. As the exciter rotor rotates, three phases of AC current are typically induced in the exciter rotor windings. Rectifier circuits that rotate with the exciter rotor rectify this three-phase AC current, and the resulting DC currents are provided to the rotor windings of the main motor/generator. Finally, as the main motor/generator rotor rotates, three phases of AC current are typically induced in the main motor/generator stator, and this three-phase AC output can then be provided to a load.

If the starter-generator is operating as a motor, AC power from the control device is supplied to the exciter stator. This AC power induces, via a transformer effect, an electromagnetic field in the exciter armature, whether the exciter rotor is stationary or rotating. The AC currents produced by this induced field are rectified by the rectifier circuits and supplied to the main motor/generator rotor, which produces a DC field in the rotor. Variable frequency AC power is supplied from the control device to the main motor/generator stator. This AC power produces a rotating magnetic field in the main stator, which causes the main rotor to rotate and supply mechanical output power.

A starter-generator, such as the one described above, may be used to start the engines or auxiliary power unit (APU) of an aircraft when operating as a motor, and to supply electrical power to the aircraft power distribution system when operating as a generator. Thus, when operating as a motor, a starter-generator may be designed to supply mechanical output torque sufficient to start the engines, and when operating as a generator, the starter-generator may be designed for optimal generator performance.

In addition to various performance criteria, the starter-generator may also be designed with certain design constraints on size and/or weight. Various starter-generator system components may impact system size and/or weight, and may simultaneously impact motor performance, generator performance, or both. For example, in order to supply sufficient output torque, the power supply that supplies the AC power to the exciter stator during operation as a motor may cause system weight, and/or size to increase, which may also cause an increase in system cost.

Hence, there is a need for a starter-generator that, when operating as a motor, can generate torque that is sufficiently high to start an aircraft engine without significantly impacting the starter-generator size and/or weight and/or cost. The present invention addresses one or more of these needs.

SUMMARY OF THE INVENTION

The present invention relates to a gas turbine engine starter-generator that, when operating as a motor, can generate torque that is sufficiently high to start an aircraft engine.

In one embodiment of the present invention, and by way of example only, a gas turbine engine starter-generator includes a housing, a shaft, a main rotor, a main stator, an exciter rotor, an exciter stator, a power supply, a capacitance element, and a control circuit. The shaft is rotationally mounted within the housing. The main rotor is mounted on the shaft, and the main stator is mounted within the housing and is located at least partially around at least a portion of the main rotor. The exciter rotor is mounted on the shaft, and the exciter stator has windings wound thereon and is mounted within the housing and is located at least partially around the exciter rotor. The power supply is electrically coupled to the exciter stator windings. The control circuit is operable to selectively electrically couple the capacitance element in series between the power supply and the exciter stator windings.

In another exemplary embodiment, a motor/generator includes a rotationally mounted main rotor, a stator, an exciter, a power supply, a capacitance element, and a control circuit. The main stator is located at least partially around at least a portion of the main rotor. The exciter includes a rotor configured to rotate with the main rotor and a stator having windings wound thereon. The power supply is electrically coupled to the exciter stator windings. The control circuit is operable to selectively electrically couple the capacitance element in series between the power supply and the exciter stator windings.

In still another exemplary embodiment, a method of operating a starter-generator in a generator mode and a motor mode in an aircraft starter-generator that includes at least an exciter assembly having a stator with windings wound thereon. AC power is supplied to the exciter stator windings via a first electrical path having a capacitance element electrically coupled in series therein, to thereby operate the starter-generator in the motor mode. DC power, rather than AC power, is supplied to the exciter stator windings via a second electrical path that does not have the capacitance element therein, to thereby operate the starter-generator in the generator mode.

In yet still another exemplary embodiment, a method of modifying a gas turbine engine starter-generator that includes at least an exciter assembly having a stator with windings thereon. A first electrical path having a capacitance element electrically coupled in series therein is electrically coupled in series with the stator windings. A second electrical path is electrically coupled in parallel with the first electrical path. At least a first controllable switch is electrically coupled in series in at least one of the first and second electrical paths.

Other independent features and advantages of the preferred starter-generator will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the present invention is not limited to use in conjunction with a specific type of electrical machine. Thus, although the present invention is, for convenience of explanation, depicted and described as being implemented in a brushless AC (alternating current) motor/generator, it will be appreciated that it can be implemented in other AC motor/generator designs needed in specific applications.

Figure 1:
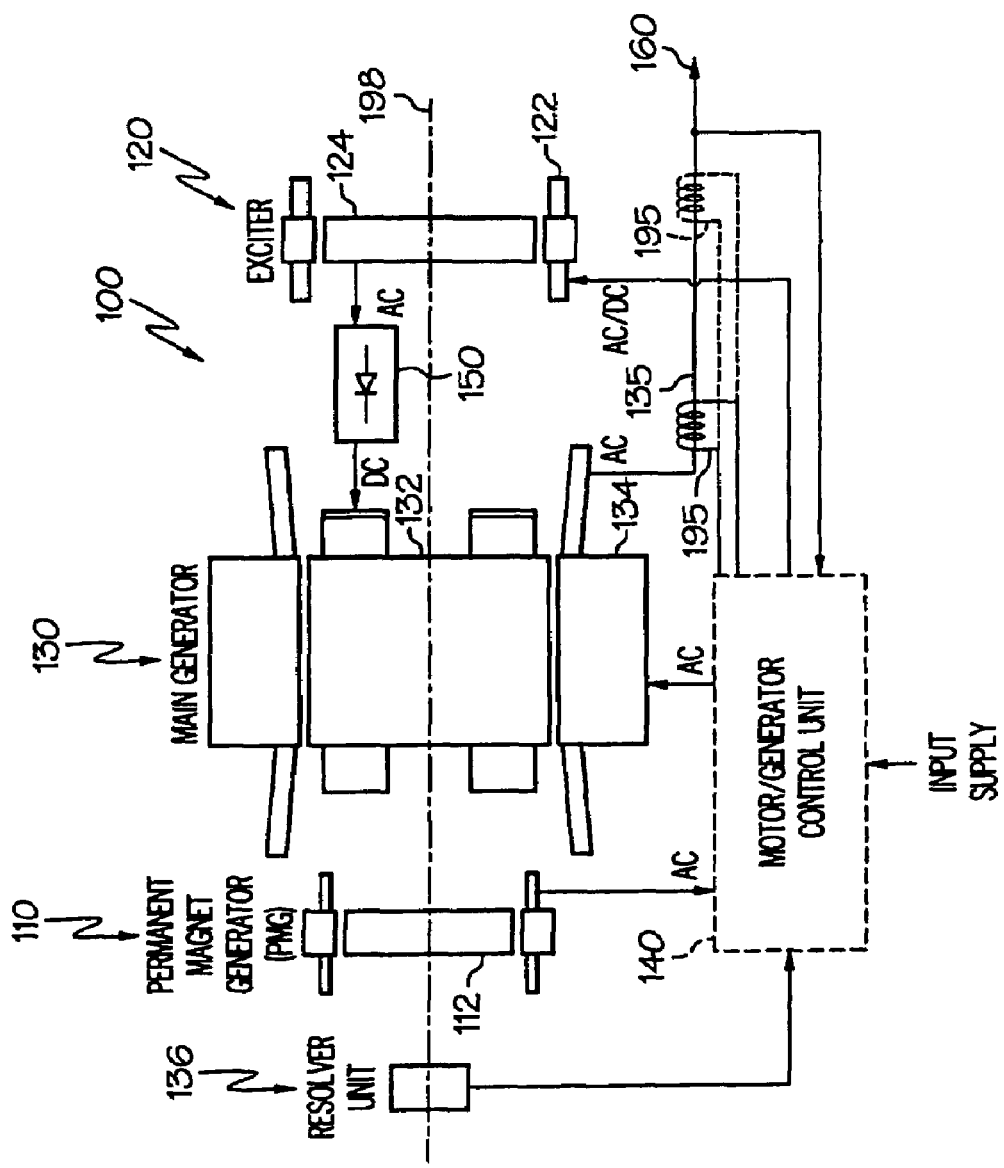
FIG. 1 is a functional schematic block diagram of an exemplary high speed starter-generator system according to an embodiment of the invention.

Turning now to the description, and with reference first to FIG. 1, a functional schematic block diagram of one embodiment of a high speed motor/generator system 100 is shown. This exemplary motor/generator system 100, which is commonly known as a brushless AC motor/generator, includes a permanent magnet generator (PMG) 110, an exciter 120, a main motor/generator 130, a motor/generator control unit 140, and one or more a rectifier assemblies 150. It is noted that the motor/generator system 100 may be used as a starter-generator for a gas turbine engine in aircraft, space, marine, land, or other vehicle-related applications where gas turbine engines are used. For aircraft applications, gas turbine engines are used for propulsion (e.g., the aircraft's main engines) and/or for power (e.g., the auxiliary power unit (APU)).

When the motor/generator system 100 is operating as a generator, a rotor 112 of the PMG 110, a rotor 124 of the exciter 120, and a rotor 132 of the main motor/generator 130 all rotate. As the PMG rotor 112 rotates, the PMG 110 generates and supplies AC power to the motor/generator control unit 140, which in turn supplies controllable direct current (DC) power to a stator 122 of the exciter 120. The exciter rotor 124 in turn supplies AC power to the rectifier assemblies 150. The output from the rectifier assemblies 150 is DC power and is supplied to the main motor/generator rotor 132, which in turn outputs AC power from a main motor/generator stator 134.

During its operation as a generator, the motor/generator system 100 is capable of supplying output power at a variety of frequencies. Alternatively, a gearing system may be used to operate the motor/generator at a constant speed and, thus, supply a constant frequency. The output power from the main motor/generator stator 134 is typically three-phase AC power. One or more stator output leads 135 supplies the generated AC power to external systems and equipment via one or more terminal assemblies 160, which are discussed in more detail below. The motor/generator control unit 140 can regulate the power output based upon monitoring signals provided to it from monitoring devices 195. In the depicted embodiment, the PMG 110, the exciter 120, and the main motor/generator 130 all rotate along a single axis 198 at the same rotational speed. It will be appreciated, however, that in other embodiments the PMG 110 may rotate along a different axis. Moreover, the relative positioning of the PMG 110, the exciter 120, and the main motor/generator 130 can be modified in different embodiments such that the exciter 120 is physically between the PMG 110 and the main motor/generator 130.

Figure 2:
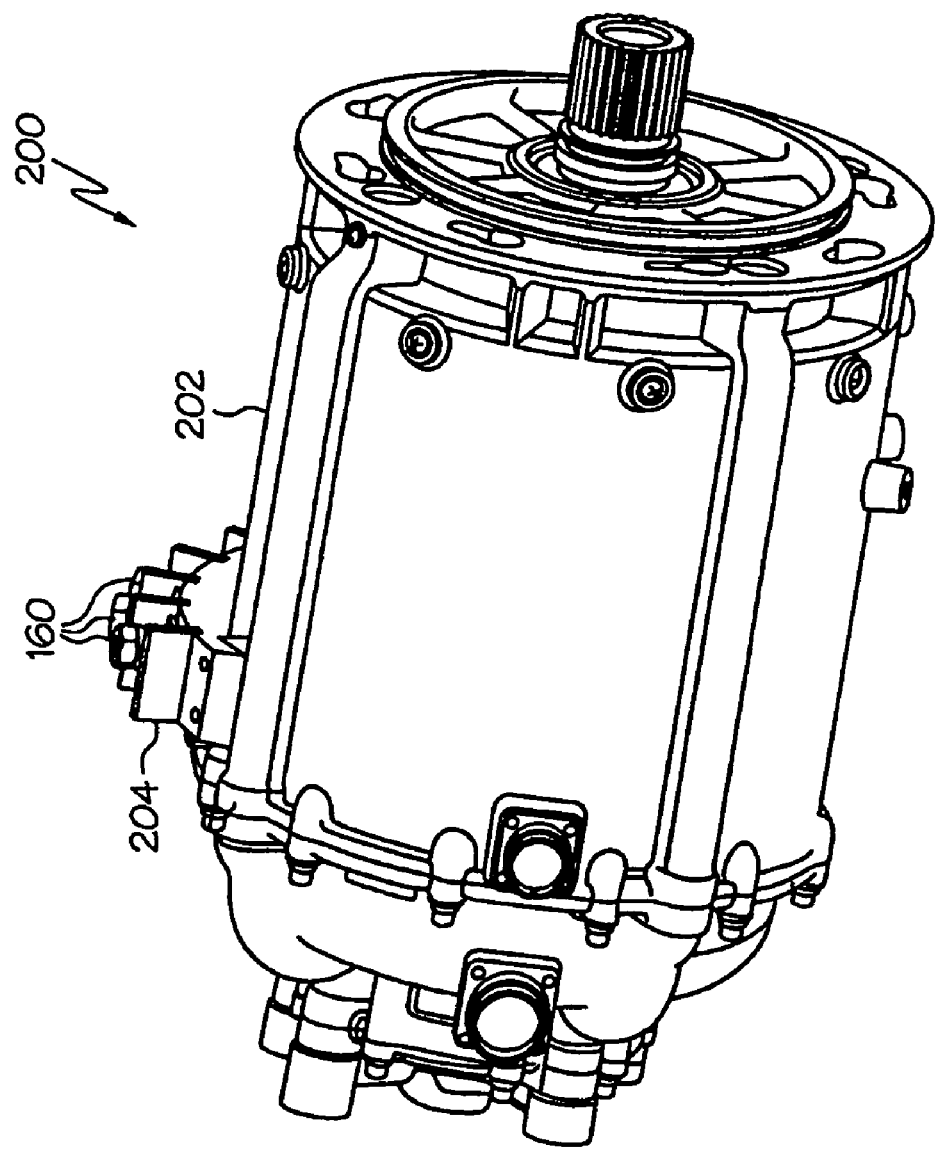
FIG. 2 is a perspective view of a physical embodiment of the starter-generator system depicted in FIG. 1.

When the motor/generator system 100 is operating as a motor, AC power is supplied to the exciter stator 122 and the main motor/generator stator 134 from, for example, an AC power supply section (discussed below) in the motor/generator control unit 140, causing the main motor/generator rotor 132 to rotate. As the main motor/generator rotor 132 rotates, the PMG 110 and exciter 120 also rotate. A position sensing device, such as a resolver unit 136, may also be included in the system 100 to supply a signal representative of the main motor/generator rotor 132 position to the motor/generator control unit 140. This position signal is used to control the AC power supplied to the main motor/generator stator 134 and to the exciter such that the maximum torque is generated. It will be appreciated, however, that the resolver unit 136 need not be included in the motor/generator system 100. Instead, the position signal may be produced using a sensorless method, in which the position is derived from various electrical signals in the motor/generator system 100 using, for example, a software algorithm. A perspective view of an exemplary physical embodiment of at least those portions of the motor/generator system 100 that are mounted within a housing 200 is illustrated in FIG. 2.

Figure 3:
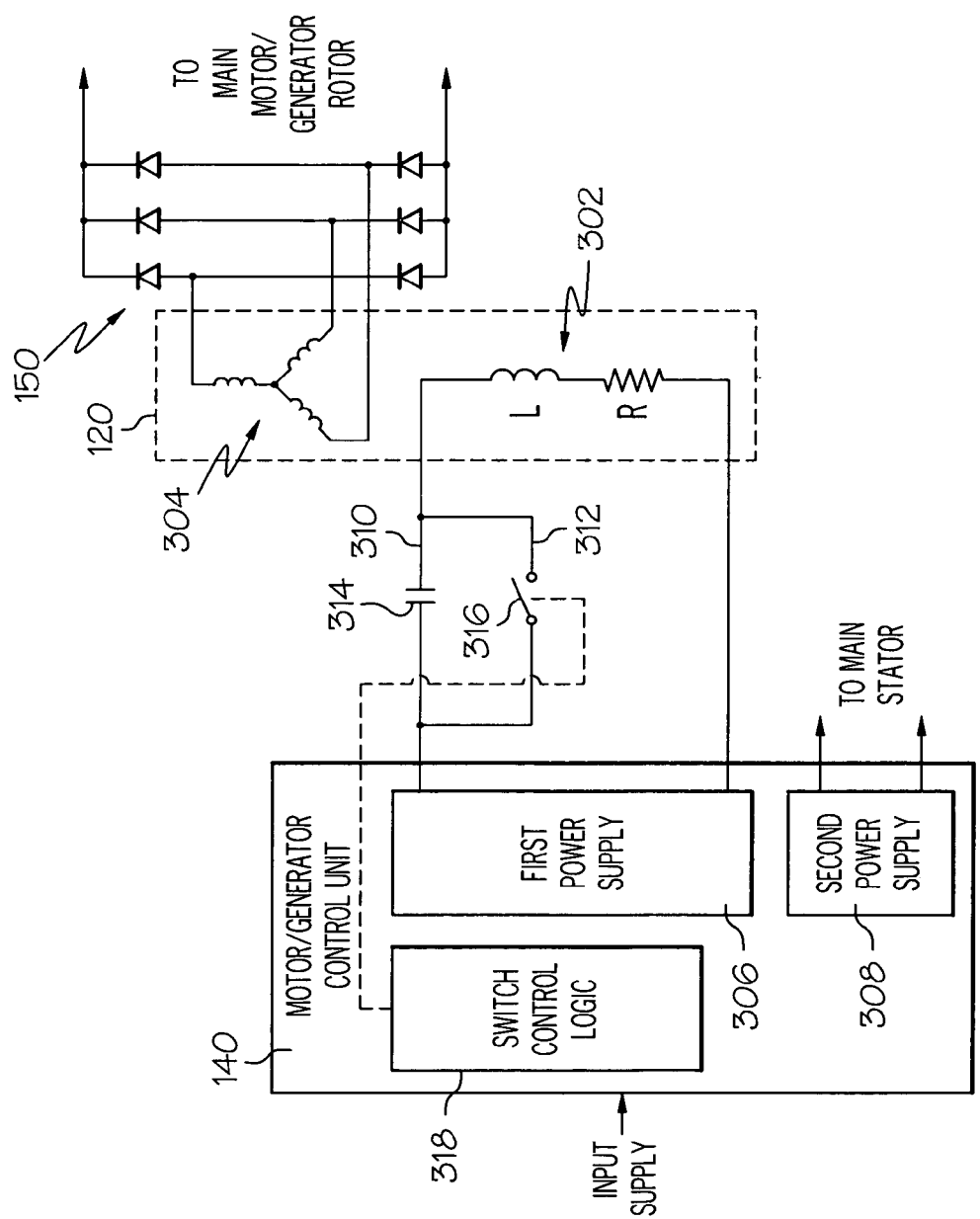
FIG. 3 is a functional schematic block diagram of one exemplary exciter generator stator winding configuration and control circuit that may be used in the starter-generator depicted in FIGS. 1 and 2.

The exciter stator 122 and exciter rotor 124, as shown schematically in FIG. 3, are each made up of a plurality of windings 302 and 304, respectively (the exciter stator windings 302 are schematically depicted as including an inductive component L and a resistive component R). As was noted above, during operation as a generator the control unit 140 supplies controllable DC power to the exciter stator windings 302, and during operation as a motor the control unit supplies AC power to the exciter stator windings 302. Thus, the control unit 140 includes a first power supply 306 that is operable to supply either DC power or AC power. It will be appreciated that the first power supply 306 may include physically separate AC and DC sections, or could be a single section that is configurable to supply either AC or DC power. When operating as a generator, the first power supply 306 supplies controllable DC power to the exciter stator windings 302. The DC power supplied to the exciter stator windings 302 generates a magnetic field in the exciter stator 122. A prime mover (not illustrated not illustrated in FIG. 3) rotates the exciter rotor 124 and AC power is induced in the exciter rotor windings 304 as the exciter rotor 124 rotates through this magnetic field.

The control unit 140 also includes a second power supply 308 that supplies AC power. When operating as a motor, the first power supply 306 supplies AC power to the exciter stator windings 302, and the second power supply 308 supplies AC power to the main motor/generator stator 134 (not illustrated in FIG. 3). The AC power supplied to the exciter stator windings 302 generates an oscillating magnetic field in the exciter stator windings 302. This oscillating magnetic field induces a voltage in the exciter rotor windings 304, which causes an AC current to flow in the exciter rotor windings 304. This AC current is rectified by the rectifier assemblies 150 and the resultant DC current is supplied to the main motor/generator rotor 132, providing the DC excitation.

The exciter stator windings 302 are wound on the exciter stator 122 and are selectively coupled to the first power supply 306 via either a first electrical circuit path 310 or a second electrical circuit path 312. The first 310 and second 312 electrical circuit paths are electrically coupled in parallel with one another and in series between the first power supply 306 and the exciter stator windings 302. The first electrical circuit path 310 includes a series-coupled capacitance circuit element 314, and the second electrical circuit path 312 includes a series-coupled controllable switch 316. It will be appreciated that the capacitance circuit element 314 may be any one of numerous circuit elements or devices that function as a capacitor. It will additionally be appreciated that the controllable switch 316 may be any one of numerous circuit elements or devices that provide a controlled switching function.

During operation as a generator, switch control logic 318 closes the switch 316. With switch 316 closed, the first electrical circuit path 310, and thus the capacitance circuit element 314, is bypassed, and the stator windings 302 are coupled to the first power supply 306 via the second electrical circuit path 312. Conversely, during operation as a motor, the switch control logic 318 opens the switch 316, which electrically opens the second electrical circuit path 312, and couples the stator windings 302 to the first power supply 306 via the first electrical circuit path 310. Placing the capacitance circuit element 314 in series with the exciter stator windings 302 allows more real power to be supplied from the first power supply 306 to the stator windings 302.

Generally, when the motor/generator system 100 is being implemented as an aircraft starter-generator, it is initially operated as a motor, since the aircraft is initially on the ground and the aircraft engine or APU is being started. Thus, switch 316 is open, electrically coupling the exciter stator windings 302 to the first power supply 306 via the first electrical circuit path 310. In addition, the first power supply 306 is electrically configured to supply AC power to the exciter stator windings 302. As noted above, this AC power induces a voltage in the exciter rotor 124, which in turn is used to provide the DC excitation to the main motor/generator rotor 132. As was also noted above, the second power supply 308 supplies AC power to the main motor/generator stator 134, which generates a field therein. The flux interaction between the main motor/generator stator 134 and main motor/generator rotor 132 gives rise to rotation. Then, when the rotational speed reaches a predetermined magnitude and is increasing, the motor/generator system 100 switches to operation as a generator. To do so, the switch control logic 318 automatically closes switch 316, bypassing the first electrical circuit path 310 and coupling the first power supply 306 to the exciter stator windings 302 via the second electrical circuit path 312. In addition, the second power supply 308 is electrically decoupled from the main motor/generator stator 134. It will be appreciated that the predetermined rotational speed at which system operation changes from the motor mode to the generator mode may vary, depending on the type of engine that is being started.

Figure 4:
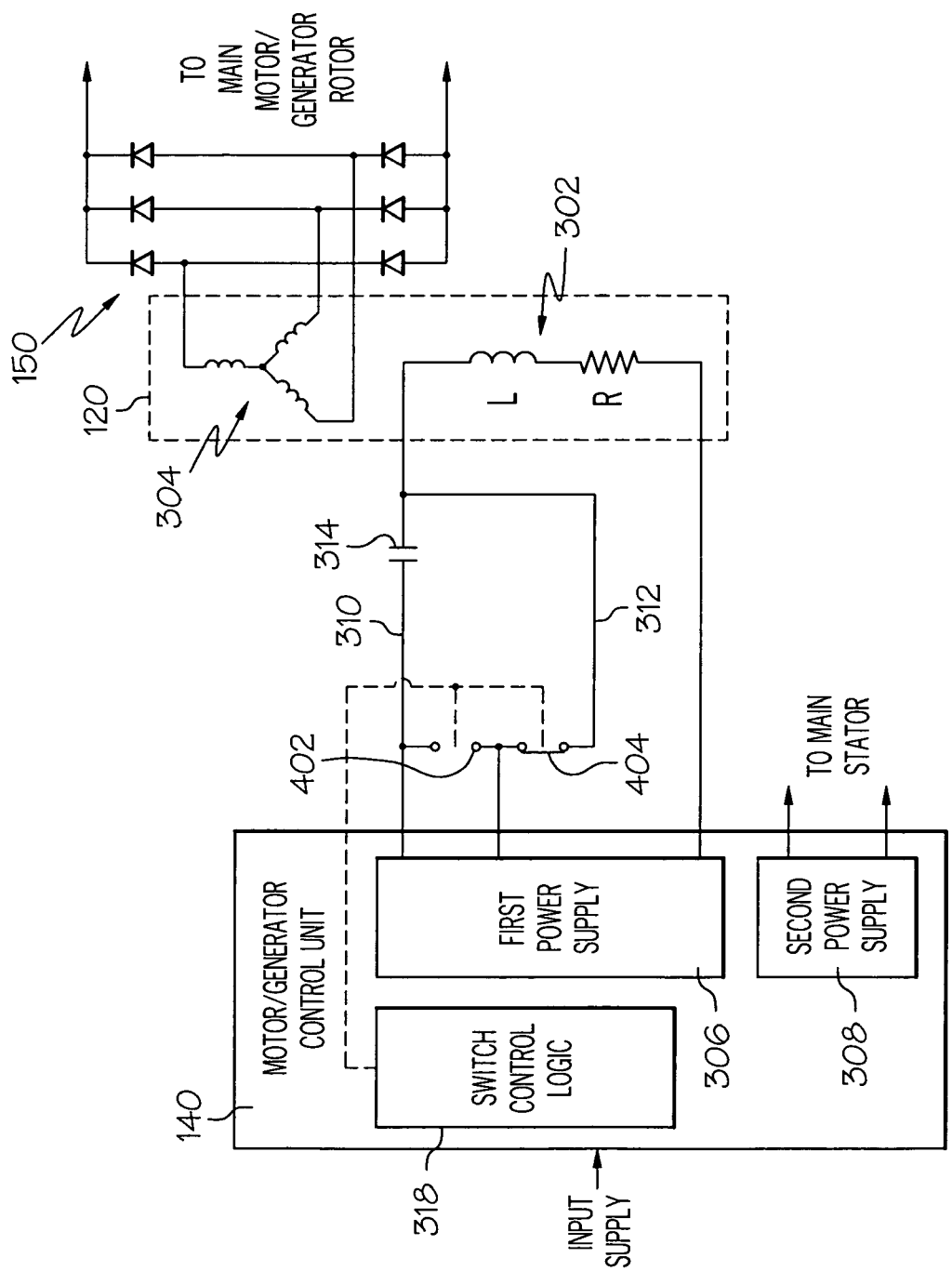
FIG. 4 is a functional schematic block diagram of another exemplary exciter generator stator winding configuration and control circuit that may be used in the starter-generator depicted in FIGS. 1 and 2.

Turning now to FIG. 4, an alternative embodiment is shown in which the first 310 and second 312 electrical circuit paths each include a series-coupled controllable switch. In particular, the first electrical circuit path 310 includes a first series-coupled controllable switch 402, and the second electrical circuit path 312 includes a second series-coupled controllable switch 404. The first 402 and second 404 controllable switches are controlled by the switch control logic 318 such that, for operation in the motor mode, the first controllable switch 402 is closed and the second controllable switch 404 is open. Conversely, for operation in the generator mode, the first controllable switch 402 is open and the second controllable switch 404 is closed. The generator system 100 operates substantially the same as the embodiment depicted in FIG. 3, with the exception of the operations of the first 402 and second 404 controllable switches.

The starting circuit and control scheme allows a starter-generator, when operating as a motor, to generate torque that is sufficiently high to start an aircraft engine without adversely impacting the starter-generator's performance in the generating mode. In addition, the present invention does so without significantly impacting the starter-generator's size, weight, and cost, since the AC power supply section included in the starter-generator control unit need not be designed to supply AC power using a relatively high AC voltage magnitude.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:
1. A motor/generator, comprising:
   a housing;
   a main rotor rotationally mounted in the housing;
   a main stator located at least partially around at least a portion of the main rotor;
   an exciter including a rotor configured to rotate with the main rotor and a stator having windings wound thereon;
   a power supply electrically coupled to the exciter stator windings;
   a capacitance element; and
   a control circuit operable to selectively electrically couple the capacitance element in series between the power supply and the exciter stator windings.
2. The motor/generator of claim 1, further comprising:
   a first electrical circuit path electrically coupled in series with the stator windings, the first electrical circuit path having the capacitance circuit element electrically coupled in series therein;
   a second electrical circuit path electrically coupled in parallel with the first electrical circuit path and in series with the stator windings; and a first controllable switch electrically coupled in series in at least one of the first and second electrical circuit paths, wherein the control circuit selectively positions the first controllable switch to selectively electrically couple the first electrical circuit path in series between the power supply and the exciter stator windings.

3. The motor/generator of claim 2, wherein the first controllable switch is electrically coupled in series in the first electrical circuit path, and wherein the starter-generator further comprises:

a second controllable switch electrically coupled in series in the second electrical circuit path, wherein the control circuit selectively positions the first and second controllable switches such that when one of the controllable switches is closed, the other is open.

4. The motor/generator of claim 3, wherein the control circuit includes:

switch control circuitry operable to selectively position the first and second controllable switches.

5. The motor/generator of claim 1, further comprising:

a first electrical circuit path electrically coupled in series with the stator windings, the first electrical circuit path having a first controllable switch and the capacitance circuit element electrically coupled in series therein; and a second electrical circuit path electrically coupled in parallel with the first electrical circuit path and in series with the stator windings, the second electrical circuit path having a second controllable switch electrically coupled in series therein, wherein the control circuit selectively positions the first and second controllable switches such that when one of the controllable switches is closed, the other is open.

6. The motor/generator of claim 5, wherein the control circuit includes:

switch control circuitry operable to selectively position the first and second controllable switches.

7. The starter-generator of claim 1, wherein the power supply is operable to selectively supply one of AC power and DC power to the exciter stator windings.

* * * * *